Sept. 22, 1970 W. A. BELFRY 3,529,863
MULTI-POSITION VEHICLE SEAT

Filed June 28, 1968 3 Sheets-Sheet 1

INVENTOR.
William A. Belfry
BY
E. J. Biskup
ATTORNEY

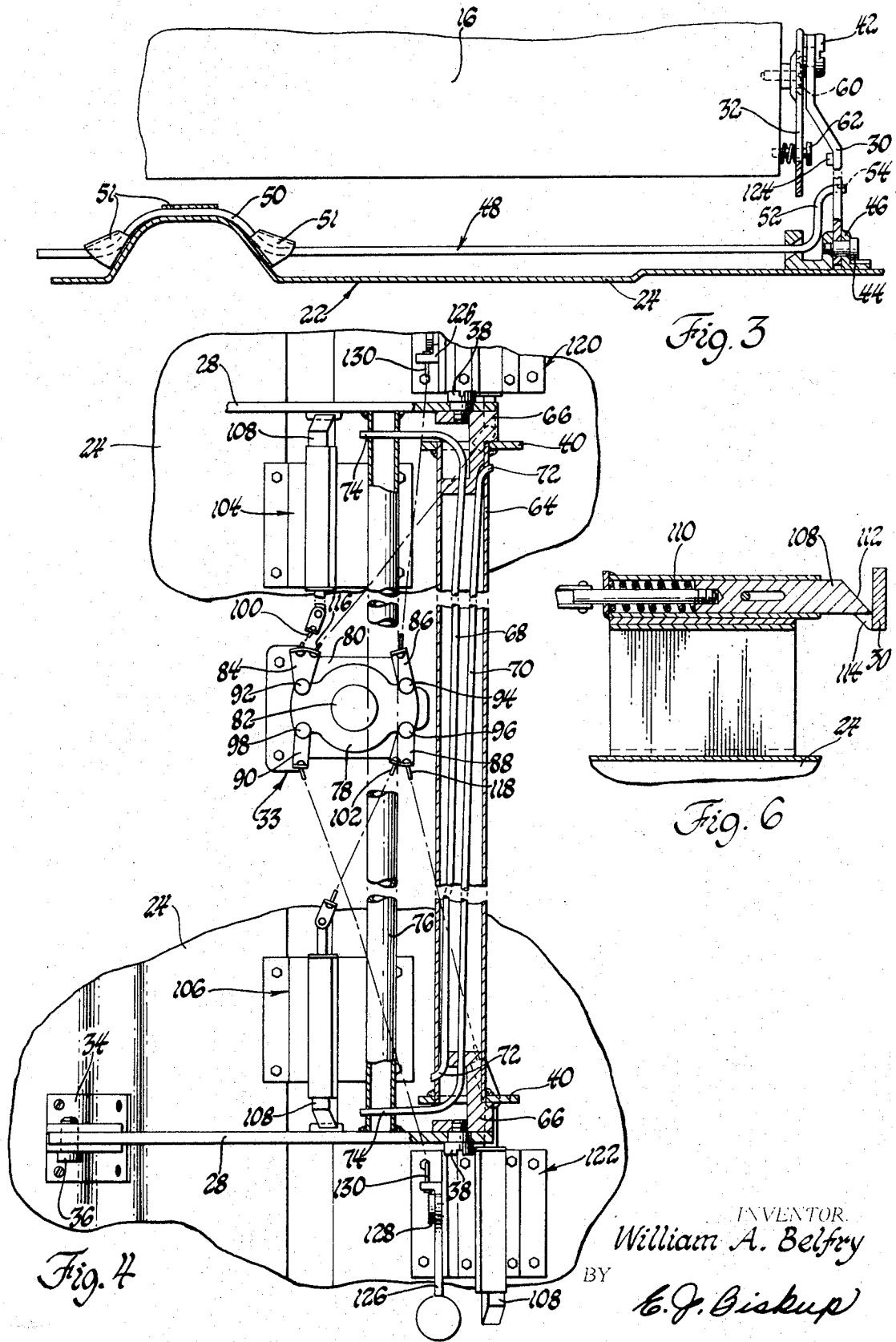

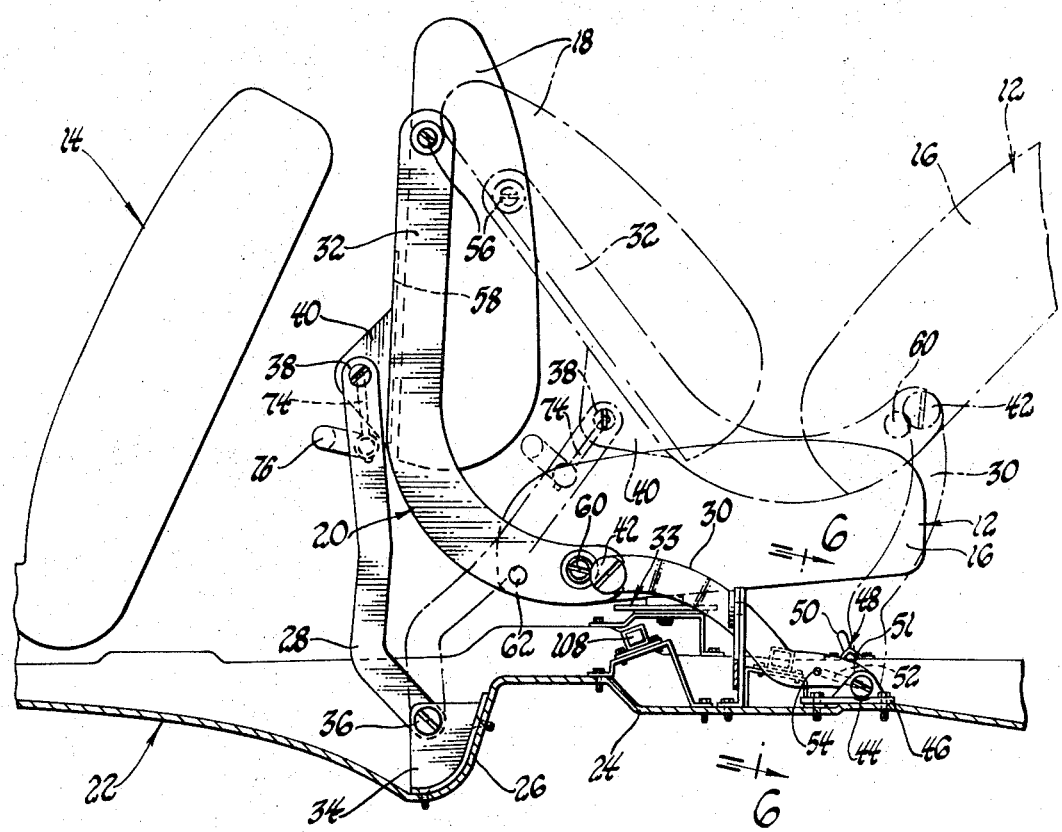

United States Patent Office 3,529,863
Patented Sept. 22, 1970

3,529,863
MULTI-POSITION VEHICLE SEAT
William A. Belfry, Rochester, Mich., assignor to General Motors Corporation, Detroit, Mich., a corporation of Delaware
Filed June 28, 1968, Ser. No. 740,954
Int. Cl. B60n 1/10
U.S. Cl. 296—66          12 Claims

ABSTRACT OF THE DISCLOSURE

A multi-position seat for a vehicle including a seat back and a seat cushion supported by a linkage which provides a first position wherein in the seat unit faces forwardly, a second position wherein the seat unit faces rearwardly, and a third position wherein the seat back and seat cushion are rotated to positions wherein they are axially aligned to provide a cargo area.

The usual seating arrangement for station wagon type vehicles includes a front seat and a second passenger's seat located to the rear of the driver's seat and foldable between a normal seating position and a folded or collapsed position when the vehicle is used for load-carrying purposes. When the second seat is in the folded position, the seat is disposed substantially flush with the rear portion of the vehicle body floor pan located above the "kick-up" portion of the frame. In this regard, one form of second seat presently used in production station wagon bodies has the seat back folded forwardly through an arc of 90° and locked in place above the seat cushion so its back side forms an extension of the floor pan. A filler panel is hingedly connected to the seat back so as to provide a support surface between the folded seat back and the floor pan that is located in the plane of the floor pan when the seat back is in the prone position to form the intermediate portion of the extended support floor.

This invention contemplates a unique seat construction of the above-described type which is foldable from a forwardly facing position so as to convert the station wagon into a cargo-carrying vehicle; and, in addition, permits the seat to be moved to a position wherein the seat back and seat cushion reverse their roles so the seat faces rearwardly. In the preferred form, this is accomplished by utilizing a linkage at each side of the seat having a pair of support links, one of which is pivotally connected between the vehicle floor and the seat cushion. The other support link is pivoted to the vehicle floor and the seat back, and an interconnecting link extends between the seat back and seat cushion for pivotal connection with the support links in a manner whereby the three positions of the seat can be realized. A suitable latching mechanism is incorporated with the linkage for maintaining the seat in both the forwardly facing position and the rearwardly facing position and torsion springs serve to aid movement of the seat between the aforementioned positions when the latching mechanism is released.

The principal objects of the present invention are to provide a support linkage for a vehicle seat that permits the latter to be moved between a forwardly facing position and a rearwardly facing position, and to a folded position for increasing the cargo-carrying area of the vehicle; to provide a seat movable to three positions so as to permit the seat occupant to face forwardly or rearwardly and have the seat back and seat cushion rotated forwardly and folded into axially aligned positions so as to extend the cargo-carrying area of the vehicle; to provide a latching mechanism which serves to lock a seat in a forwardly facing position and a rearwardly facing position; to provide a seating unit for a station wagon type vehicle that is located to the rear of the driver's seat and has the seat cushion and seat back supported by a linkage which permits the seat back and seat cushion to reverse roles so that the seat unit can be moved from a forwardly facing position to a rearwardly facing position; and to provide a vehicle seat support linkage which controls movement of an interconnecting link which supports a seat back and a seat cushion so that the seat can be moved as a unit from a forwardly facing position to a rearwardly facing position.

Other objects and advantages of the present invention will be apparent from the following detailed description when taken with the drawings in which:

FIG. 3 is a view taken on line 3—3 of FIG. 2 showing one of the torsion rods incorporated with the support linkage for facilitating movement of the seat;

FIG. 4 is a view taken on line 4—4 of FIG. 2 and shows a latching mechanism which serves to lock the seat in a forwardly facing position and a rearwardly facing position;

FIG. 5 is a view showing the seat located in the rearwardly facing position;

FIG. 6 is a view taken on line 6—6 of FIG. 5 and shows the details of construction of one of the lock members incorporated with the latching mechanism of FIG. 4; and FIG. 7 shows the seat in its third position wherein the seat back and seat cushion are folded forwardly so that the back sides thereof are axially aligned to provide a cargo-carrying area.

Figure 1:
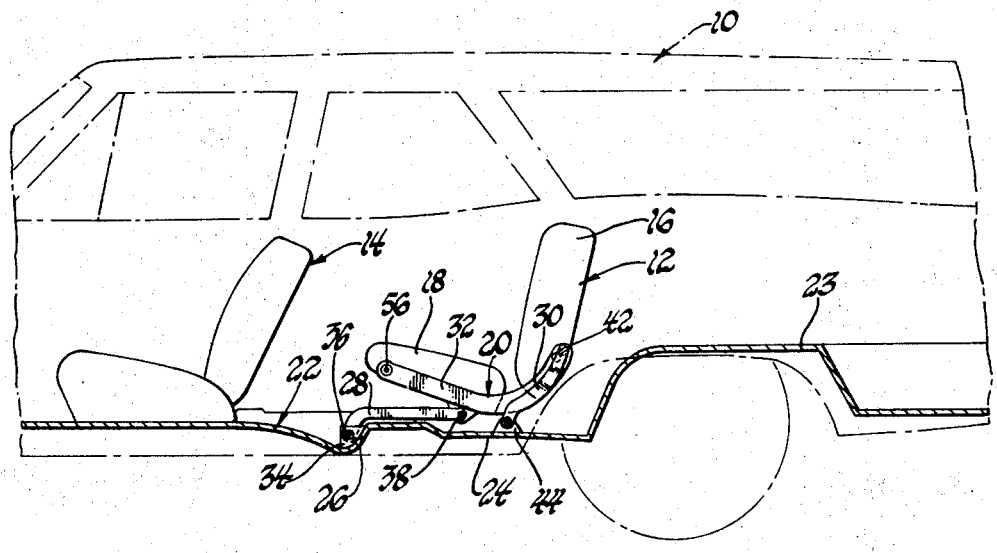
FIG. 1 shows a station wagon type vehicle incorporating a front driver's seat and a rear seat made according to the present invention.

Referring to the drawings and more particularly FIG. 1 thereof, a station wagon type vehicle 10 is shown having a second passenger seat 12 made in accordance with the invention located to the rear of a front or driver's seat 14. The second passenger seat 12 comprises a seat back 16 and seat cushion 18, both of which are supported by support linkage 20 connected to the vehicle floor pan 22 for maintaining the seat 12 in one of the three positions it is capable of assuming as will hereinafter be explained. The floor pan 22 of the station wagon body includes a kick-up portion 23 which forms the permanent cargo support floor, and a mounting portion 24 for the second seat 12. Just forward of the mounting portion 24 is a downwardly extending portion 26 which provides foot space for the passengers seated in the seat 12. At this point, it will be noted that only one side of the seat 12 is shown and therefore it will be understood that the linkage to be described has corresponding and identical parts located on the opposite side thereof.

Figure 2:
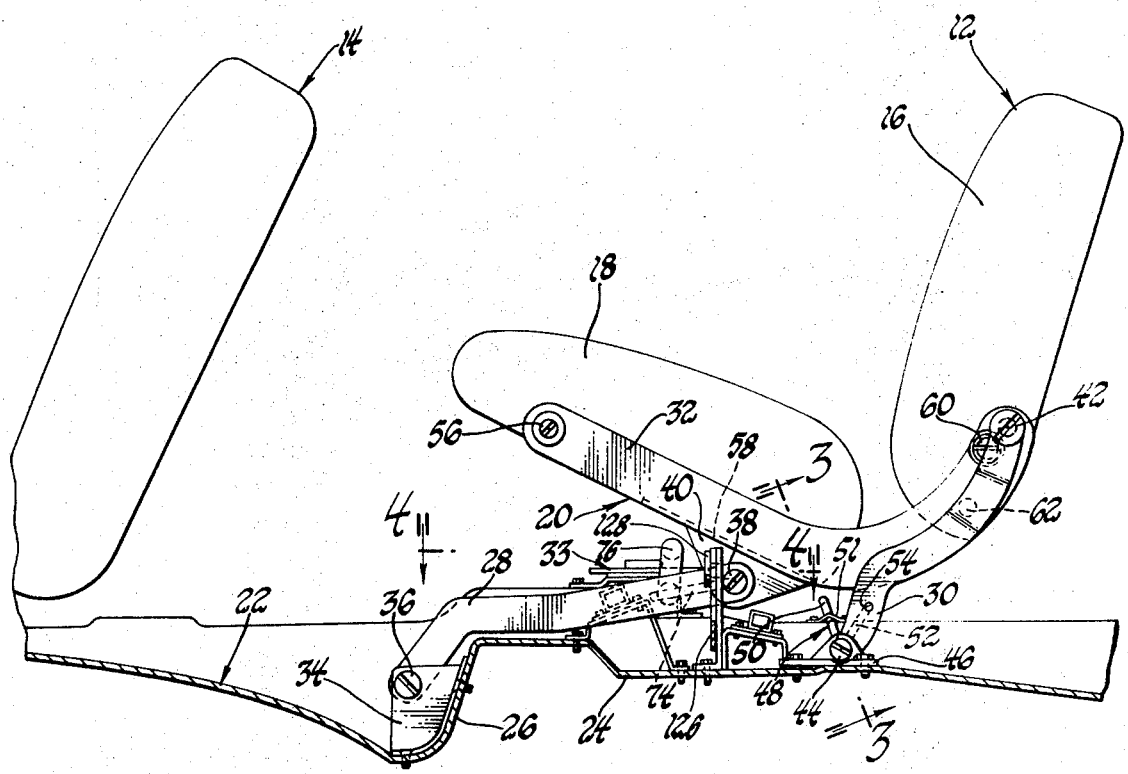
FIG. 2 is an enlarged view of the rear seat and shows the relative positions of the various links of the support linkage when the seat is in a forwardly facing position.

As seen in FIG. 2, the support linkage 20 comprises a pair of support links 28 and 30 and an interconnecting link 32, all of which are connected in a manner so as to support the seat 12 in the forwardly facing position shown in FIG. 2, the rearwardly facing position seen in FIG. 5, and the folded cargo position seen in FIG. 7, when held in a locked position by a latching mechanism 33. More specifically, the front support link 28 has the lower end thereof pivotally connected to a bracket member 34 by a pivotal connection 36. The bracket member 34 in turn is rigidly secured to the downwardly extending portion 26 of the floor pan and as seen in FIG. 4, includes two plates between which the support link 28 is supported. The upper end of the support link 28 is connected by a pivotal connection 38 to a bracket 40 rigidly fixed with and depending from the interconnecting link 32. The rear support link 30 has the upper portion thereof pivotally connected to the interconnecting link 32 by a pivot connection 42 while the lower end of the support link 30 is supported by a pivotal connection 44 located within a bracket member 46 secured to the mounting portion 24 of the floor pan. As seen in FIG. 3, a torsion rod 48 has an offset intermediate portion 50 secured to the floor pan 22 by hold-down clamps 51 and has each end 52 formed as a hook located within an aperture 54 in the support link 30. The torsion rod 48 has a neutral position when the support link 30 is in the phantom line position of FIG. 5 or, as seen in FIG. 2, when the end 52 is aligned with or in the plane of the intermediate portion 50. Accordingly, with the support link 30 in the position shown in FIG. 2, the torsion rod 48 is applying a counterclockwise force upon the support link 30 that is acting about the pivotal connection 44.

The interconnecting link 32 is L-shaped and has the forward end pivotally connected at a pivot point 56 to a forward portion of the seat cushion 18 which as seen in FIG. 2 has the rear portion thereof resting on a transversely extending plate 58 rigidly connected with and spanning the area between the interconecting links 32 on each side of the seat cushion. The rear end of the interconnecting link 32 supports the seat back 16 at a pivot point 60 and maintains the seat back in the position shown by a manually releasable latch 62 seen in FIG. 3. Adjacent the interconnecting link 32, the lower side of the plate 58 fixedly carries the downwardly depending bracket 40 which is rigidly secured to a transverse tube 64 as seen in FIG. 4.

A pivot support 66 is fixed with and projects out of each end of the tube 64 and provides the pivotal connection 38 with the rear end of the support link 28. A pair of identical torsion rods 68 and 70 are located in the tube 64 with one end 72 of each secured to the tube while the other end 74 of each torsion rod extends forwardly for rigid connection with a tie bar 76 having the opposite ends fixed with the laterally spaced support links 28. The torsion rods 68 and 70 have a neutral position when the support link 28 is located in the midway phantom line position shown in FIG. 5. Thus, as seen in FIG. 2, the torsion rods are applying a counterclockwise force to the support link 28 about pivotal connection 36 urging the seat 12 upwardly and forwardly but prevented from doing so because of the latching mechanism 33 being in a locked position.

As alluded to hereinbefore, the latching mechanism 33 holds the seat 12 in the forwardly facing position of FIG. 2 and the rearwardly facing position of FIG. 5. In this connection, it will be noted that the latching mechanism 33 comprises a pivot plate 78 mounted on a pivot support 80 for pivotal movement about a pivot point 82. The pivot support 80 is secured to the floor mounting portion 24 while the pivot plate 78 has secured thereto cable supports 84, 86, 88 and 90 which are pivotally connected to the pivot plate at pivot points 92, 94, 96 and 98, respectively. Cables 100 and 102 are connected with cable supports 84 and 88 and lead to identical bolt assemblies 104 and 106 which serve to maintain the seat 12 in the forwardly facing position. Each of the bolt assemblies 104 and 106 include a slidable bolt 108 which as seen in FIG. 6 is normally projected outwardly by a coil spring 110. The bolt 108 has a tapered surface 112 facing upwardly so when the support links 28 are moved to the position of FIG. 2, a catch 114 engages the surface 112 of the bolt 108 to move the latter inwardly against the bias of the spring 110. When the bolt 108 reaches the position of FIG. 6, it is urged outwardly so as to lock the support link 28 in place and, accordingly, restrain the seat 12 from movement. The cable supports 84 and 88 also have cables 116 and 118 which respectively lead to identical bolt assemblies 120 and 122 that serve to hold the seat 12 in the rearwardly facing position of FIG. 6. Each of the bolt assemblies 120 and 122 function in the same manner as, and include bolt constructions which are identical to, those incorporated in bolt assemblies 104 and 106 and serve to engage a similar catch 124 formed with the support links 30 as seen in FIG. 3.

A handle 126 for retracting the bolt 108 in each of the bolt assemblies 104, 106, 120 and 122 is pivotally supported by a pin 128 for movement about a longitudinally extending horizontal axis passing through the pin 128. The handle 126 has the inner end thereof connected to a cable 130 which leads to the cable support 86 from one side of the seat and to cable support 90 from the other. Thus, by raising the handle 126, the cable 130 is drawn toward the handle resulting in the pivot plate 78 being rotated in a counterclockwise direction and simultaneously retracting the bolts 108 in all four of the bolt assemblies 104, 106, 120 and 122.

OPERATION

Referring to FIG. 2, the seat 12 is shown in the forwardly facing position and held therein by the latching mechanism 33 described above. Should it be desired to convert the seat 12 to a load-supporting platform, this can be done by simply raising the rear portion of the seat cushion 18 and rotating it approximately 180° about the pivot point 56 to the position shown in FIG. 7 at which time a suitable stop means (not shown) on the seat cushion 18 will engage the underside of the interconnecting link 32 and hold the seat cushion from further rotation. Thereafter, the latch 62 is released and the seat back 16 is rotated counterclockwise approximately 90° about its pivot point 60 with the interconnecting link 32 to the position of FIG. 7. As in the case with the seat cushion 18, the seat back 16 can be locked in this position and permit the back side thereof to be horizontally aligned with the back side of the seat cushion 18 so as to provide a planar surface located in the same plane as the kick-up portion 23 of the vehicle. In order to return the seat 12 to the position of FIG. 2 it should be apparent that the aforementioned movements of the seat back 16 and seat cushions 18 are merely reversed so they reassume their original positions permitting a passenger to face forwardly in the seat.

If it should be desired to have the seat 12 move from the forwardly facing position of FIG. 2 to the full-line rearwardly facing position of FIG. 5, this can be accomplished by raising the handle 126 which, in turn, causes rotation of the pivot plate 78 and retraction of the bolts 108 located in the bolt assemblies 104 and 106 as described above. The torsion rods 48, 68 and 70 then cause the support links 28 and 30 to rotate in a counterclockwise direction about their pivotal connections 36 and 44 with the floor pan 22 so as to move the interconnecting link 32 together with the seat cushion 18 and seat back 16 as a unit to the intermediate position shown in phantom lines in FIG. 5. Thereafter, the seat 12 is manually forced against the bias of the torsion rods 48, 68 and 70 to the full-line position of FIG. 5, at which time the support links 30 are locked in place by the bolt assemblies 120 and 122. To return the seat 12 to its original position, the handle 126 is raised once again so as to retract the bolts 108 in the bolt assemblies 120 and 122 so as to permit the torsion rods 48, 68 and 70 to move the seat structure again to the intermediate position mentioned before. Thereafter, manual force again must be used to position the seat 12 in the full-line forward facing position of FIG. 2.

It will be noted that when the seat is in the forwardly facing position of FIG. 2, the links 28, 30 and 32 are so arranged that the included angle formed by a pair of straight lines connecting the center points of the pivotal connections 36 and 38 and the pivotal connections 38 and 42 is substantially greater than 90°. However, when the seat is in the rearwardly facing full-line position of FIG. 5, the included angle between a pair of lines connecting the same pivotal connections is substantially less than 90°.

Various changes and modifications can be made in this construction without departing from the spirit of the invention. Such changes and modifications are contemplated by the inventor and he does not wish to be limited except by the scope of the appended claims.

I claim:

1. In combination with a vehicle body, a seat having a seat cushion and a seat back, said seat back and said seat cushion including front and back surfaces, the improvement comprising linkage on each side of the seat supporting the seat cushion and seat back for unitary movement between a first position wherein the front surfaces of said seat back and said seat cushion define a forwardly facing seat and a second position wherein said front surfaces of said seat back and seat cushion define rearwardly facing seat and for independent inversion to a folded position wherein said back surfaces of said seat back and seat cushion are aligned to form a load carrying surface, each of said linkages comprising front and rear links having their lower ends pivotally connected to the vehicle body for rotation about first and second horizontally spaced pivot axes, an interconnecting link connected to the upper ends of the front and rear links for relative rotation about third and fourth pivot axes, said interconnecting link including means for supporting the seat cushion and seat back on the interconnecting link in fixed relative positions when said seat is in said first position and in said second position and while being moved therebetween, said interconnecting link further including means operative to permit bodily inversion of said seat back and seat cushion relative to said interconnecting link from said first position to said folded position.

2. The combination of claim 1 wherein said links are so located that the included angle formed by a pair of straight lines connecting the first and third pivot axes and the third and fourth pivot axes in substantially greater than 90° when the seat is in the first position and substantially less than 90° when the seat is in the second position.

3. A three-position seat for a vehicle including a seat back and seat cushion, a linkage supporting said seat and providing a first position wherein said seat faces forwardly, a second position wherein said seat faces rearwardly, and a third position wherein said seat back and seat cushion are axially aligned to provide a cargo area, said linkage comprising first and second support links having the lower ends pivotally connected to the vehicle for movement about first and second pivot axes, an interconnecting link connected to the upper ends of said first and second support links for movement about third and fourth pivot axes and having means for supporting the seat cushion and seat back for independent pivotal movement about fifth and sixth pivot axes, said interconnecting link supporting said seat cushion and seat back in normal seat-forming positions when said seat is in said first and second positions and providing for forward pivotal movement about said fifth and sixth pivot axes to permit said seat to be converted from said first position to said third position.

4. The seat of claim 3 wherein said links are so located that when the seat is in the first position a line connecting the first and third pivot axes passes between the second and fourth pivot axes.

5. In combination with a vehicle body, a seat having a seat cushion and a seat back, said seat back and seat cushion including front and back surfaces, the improvement comprising linkage on each side of the seat providing the seat cushion and seat back with support for unitary movement between a first position wherein the front surfaces of said seat back and said seat cushion define a forwardly facing seat and a second position wherein said front surfaces of said seat back and seat cushion define a rearwardly facing seat and for independent rotation to a folded position wherein said back surfaces of said seat back and seat cushion are aligned to form a load carrying surface, each of said linkages comprising front and rear links having their lower ends pivotally connected to the vehicle body for rotation about first and second horizontally spaced pivot axes respectively, an interconnecting link having an intermediate and rear portion pivotally connected to the upper ends of the front and rear links for relative rotation about third and fourth pivot axes, said interconnecting link including means for supporting the seat cushion and seat back on the interconnecting link in fixed relative positions when said seat is in said first position and in said second position and while beng moved therebetween and for independent rotation relative to said interconnecting link about fifth and sixth pivot axes thereon, a latching mechanism for automatically locking said seat in position when the latter assumes said first and said second positions, and spring means connected to said links for facilitating movement of said seat between said first and second positions upon release of said latching mechanism.

6. The combination of claim 5 wherein said spring means is a torsion rod connected between the floor and the rear support link.

7. The combination of claim 5 wherein said spring means includes an over-center type spring having a neutral position generally midway between said first and second seat positions and operable on one side of said neutral position to urge said seat out of one of said first and second positions and operable on the other side of said neutral position to urge said seat out of the other of said first and second positions.

8. The combination of claim 5 wherein said latching mechanism includes slidable bolt means which engage a catch formed on said front support link when the seat is in said first position and engage a catch formed on said rear support link when the seat is in the second position.

9. The combination of claim 8 wherein said latching mechanism includes a pivot plate rotatably supported by the vehicle floor, cable means connecting said pivot plate to said bolt means, and a manually operable handle connected to said pivot plate for rotating the latter whereby said bolt means is retracted to release said support links when said seat is in said first and second positions.

10. The combination of claim 5 wherein said spring means is a torsion rod connected to said front support link.

11. The combination of claim 10 wherein said torsion rod is connected between said interconnecting link and said front support link.

12. A three-position seat for a vehicle including a seat back and seat cushion, a linkage supporting said seat and providing a first position wherein said seat faces forwardly, a second position wherein said seat faces rearwardly, and a third position wherein said seat back and seat cushion are axially aligned to provide a cargo area, said linkage comprising first and second support links having the lower ends pivotally connected to the vehicle for movement about first and second pivot axes, an L-shaped interconnecting link having an intermediate portion and rear portion pivotally connected to the upper ends of said first and second support links for movement about third and fourth pivot axes and having means supporting the seat cushion and seat back for independent pivotal movement about fifth and sixth pivot axes, said interconnecting link supporting said seat cushion and seat back in normal seat-forming positions when said seat is in said first and second positions and providing for forward pivotal movement about said fifth and sixth pivot axes respectively located on said seat cushion and said seat back so as to permit said seat to be converted from said first position to said third position, a latching mechanism for automatically locking said seat in position when the latter assumes said first position and said second position, and spring means in the form of torsion rods connected to said links for facilitating movement of said seat between said first and second positions upon release of said latching mechanism.

References Cited
UNITED STATES PATENTS

| | | | |
|---|---|---|---|
| 2,019,266 | 10/1935 | Meilves | 297—92 X |
| 3,175,861 | 3/1965 | Tcherniavsky | 5—48 X |
| 3,188,133 | 6/1965 | Tewksbury | 296—65 |
| 3,198,573 | 8/1965 | Betts | 296—69 |

LEO FRIAGLIA, Primary Examiner

J. A. PEKAR, Assistant Examiner

U.S. Cl. X.R.

297—92